United States Patent
Cross et al.

(10) Patent No.: US 6,845,312 B1
(45) Date of Patent: Jan. 18, 2005

(54) METHOD FOR DETECTING ENGINE KNOCK

(75) Inventors: Travis A. Cross, Manistique, MI (US); Jason Tartt, West Bend, WI (US); Thomas S. Kirchhoff, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/641,237

(22) Filed: Aug. 14, 2003

(51) Int. Cl.[7] ............................................. F02P 5/152
(52) U.S. Cl. ................ 701/111; 701/114; 123/406.2; 123/406.39
(58) Field of Search .................... 701/111, 110, 701/115; 123/406.2, 406.16, 406.23, 406.36, 406.37, 406.39; 73/35.05, 117.3

(56) References Cited

U.S. PATENT DOCUMENTS

| | | | |
|---|---|---|---|
| 4,111,035 A | 9/1978 | West et al. ................. | 73/35.05 |
| 4,583,175 A * | 4/1986 | Abe et al. .................... | 701/111 |
| 4,770,144 A | 9/1988 | Sakakibara et al. ..... | 123/406.35 |
| 4,903,664 A | 2/1990 | Shinshi .................. | 123/406.17 |
| 4,971,007 A | 11/1990 | Gopp et al. ............ | 123/406.23 |
| 5,060,615 A | 10/1991 | Hashimoto et al. ..... | 123/406.16 |
| 5,083,278 A | 1/1992 | Matsuura .................... | 701/111 |
| 5,121,729 A * | 6/1992 | Hashimoto et al. ..... | 123/406.16 |
| 5,140,962 A | 8/1992 | Iwata .................... | 123/406.35 |
| 5,263,365 A | 11/1993 | Muller et al. .............. | 73/117.3 |
| 5,645,034 A | 7/1997 | Entenmann et al. ... | 123/406.33 |
| 5,744,698 A | 4/1998 | Genot ....................... | 73/35.11 |
| 6,330,874 B2 | 12/2001 | Cianciara et al. ........ | 123/406.2 |

FOREIGN PATENT DOCUMENTS

JP 3-267547 A * 11/1991 ........... F02D/45/00

* cited by examiner

*Primary Examiner*—Hieu T. Vo
(74) *Attorney, Agent, or Firm*—William D. Lanyi

(57) ABSTRACT

A method for processing knock-related data reduces the memory locations required for the method and also simplify the processing steps needed to determine a sum, average, and threshold value relating to magnitudes of knock ratios. Inputs from either pressure sensor or accelerometers are filtered and then used to form a ratio between a knock portion of a curve and a reference portion. Sequential magnitudes of the knock ratio are received and analyzed in a manner that reduces required memory locations and improves processing speed.

20 Claims, 4 Drawing Sheets

METHOD FOR DETECTING ENGINE KNOCK

BACKGROUND OF THE INVENTION

1. Field of the Invention

The present invention is generally related to a method for detecting the occurrence of engine knock events and, more particularly, to a strategy which achieves the advantages of a moving average technique without the inherent disadvantages of requiring significant memory for storing data and time for data manipulations and calculations.

2. Description of the Prior Art

Improper combustion, which is commonly referred to as knock, is a well known limitation on internal combustion engine power generation. To achieve maximum engine power, it is necessary to appreciate the disadvantages of engine knock and provide an efficient method for detecting it.

When an additional flame front is initiated at the cylinder walls due to the increasing temperature and pressure resulting from the spark initiated flame front, engine knock will occur. When these two flame fronts collide with each other within the combustion chamber, cylinder pressure spikes and resonates causing piston and valve pitting, and crankshaft and rod bearing degradation. Engine knock dramatically decreases the life of an internal combustion engine and appropriate actions must be taken in order to limit this phenomena.

The various causes and cures of engine knock are generally known to those skilled in the art and will not be described in detail herein. In addition, various methods for measuring and monitoring engine knock are also well known. Basically, a pressure transducer can monitor the pressure waves within the combustion chamber and provide signals that represent the variations in intensity sensed by the pressure sensor. An accelerometer can be used to detect forces that cause vibration of the engine. Accelerometers provide signals that represent the intensity of the vibrations. When properly analyzed, signals from pressure sensors and accelerometers can be useful in detecting the occurrence and intensity of engine knock.

Various techniques are known to those skilled in the art for analyzing signals received from pressure sensors and accelerometers for the purpose of detecting the occurrence of engine knock. In addition, various mathematical and statistical techniques are known by those skilled in the art for processing a stream of sequential signals received from either a pressure sensor or an accelerometer.

U.S. Pat. No. 6,330,874, which issued to CIANCIARA et al on Dec. 18, 2001, describes a method for cylinder-selective knock control of an internal combustion engine. The total ignition angle of each cylinder is composed of cylinder-selective values basic ignition angle, knock adjustment angle, in addition to a first adaptation value and a second adaptation value which are common to all cylinders. The first adaptation value is increased when the knock adjustment angle is greater than a threshold magnitude and is reduced when the knock adjustment angle is less than a threshold. The second adaptation value is formed as a function of the average value of the adaptation values for all cylinders.

U.S. Pat. No. 5,744,698, which issued to Genot on Apr. 28, 1998, describes an accelerometric sensor for measuring the piston knock of an internal combustion engine. The sensor is intended for measuring pinging in an internal combustion engine. The sensor includes a base in the form of a sleeve with a flange extending therefrom and supporting at least one stacked piezoelectric ring, connecting disks and a seismic weight. The underside of the base is used as a contact surface between the sensor and the part to be measured. The underside has a central recess such that the average load distribution diameter over the contact surface is no smaller than the average of the shoulder. This shape may be achieved with a recess which is coaxial with the sleeve and which has a diameter greater than the external diameter thereof. The shape may alternatively be achieved by forming the underside in a concave shape.

U.S. Pat. No. 5,645,034, which issued Entenmann et al on Jul. 8, 1997, describes a method for the adaptive knock control of an internal combustion engine. The method serves the purpose of shifting the ignition angle of an internal combustion engine in the retard direction when knocking occurs and for subsequently carrying out a return of the ignition angle in the advance direction. At the same time, the internal combustion engine is to have sub-divided operating ranges, and a value of an ignition-angle retard, determined in a range during operation, is always stored when this range is left. At the same time, in particular an average of all the ignition angles outputted in a range or a retard value is plotted by a digital low-pass filter and is stored.

U.S. Pat. No. 5,140,962, which issued to Iwata on Aug. 25, 1992, describes a knock sensing apparatus for an internal combustion engine. The apparatus is intended for use with a multi-cylinder internal combustion engine and has a knock sensor that generates an electrical output signal corresponding to vibrations of the engine. A peak hold circuit generates a level signal indicating the level of the output signal of the knock sensor during a prescribed period. The level signal is compared with a threshold determined by the operating region of the engine. When the level signal exceeds the threshold level, it is determined that the engine is knocking. According to one form of the present invention, the threshold is determined on the basis of the output signals from a plurality of sensors for sensing different operating conditions of the engine. In a preferred embodiment, the sensors include a sensor for sensing an indication of the engine rotational speed and an engine load sensor. According to another form of the present invention, the threshold is then corrected in accordance with the difference between the actual noise level of the engine as indicated by an average of the level signal and an expected noise level determined by the operating condition detected by the sensor. The corrected threshold is then compared with the level signal to determine if knocking is taking place.

U.S. Pat. No. 5,083,278, which issued to Matsuura on Jan. 21, 1992, describes a knocking detection device for an internal combustion engine. An improvement of a knocking detection device is disclosed for an automotive engine mounted on a vehicle having a knock sensor for detecting analog vibration waveforms of the engine, and a crank position sensor for producing signal corresponding to a predetermined crank angle of the engine. The devise comprises a conversion circuit for converting the analog waveforms detected by the knock sensor into digital data every predetermined sampling period; a decision circuit for deciding a first conversion term corresponding to no knocking period and a second conversion term corresponding to knocking possibility period in one cycle of the engine; a setting circuit for setting a discrimination level based on a first average value of the digital data from the conversion circuit during the first conversion term decided by the decision circuit; calculation circuit for calculating knocking level based on a second average value of the digital data for the conversion circuit during the second conversion term decided by the decision circuit; and a determination circuit for determining knocking occurrence by comparing the knocking level calculated by the calculation circuit with the discrimination level set by the setting circuit, so as to determine knocking occurrence when the knocking value is larger than the discrimination level.

U.S. Pat. No. 5,060,615, which issued to Hashimoto et al on Oct. 29, 1991, describes a knock sensing apparatus for an internal combustion engine. The apparatus has a knock sensor that generates an electrical output signal corresponding to vibration of the engine. A level indicating means generates a first level signal indicating the level of the output signal of the knock sensor during the first period at least partially coinciding with the power stroke in a cylinder of the engine and a second level signal indicating the level of the output signal of the knock sensor during a second period. An averager forms an average of the second level signal over a prescribed period, and a threshold calculator calculates a threshold based on the average. A comparator compares the first level signal and the threshold and generates a signal indicating knocking when the first level signal exceeds the threshold.

U.S. Pat. No. 4,971,007, which issued to Gopp et al on Nov. 20, 1990, describes a system and method for combined knock and torque timing control. The system control ignition knock while maintaining minimum spark for best torque. Both knock control and minimum spark for best torque control are simultaneously utilized. During knock control, engine cycles are counted between successive knock detections. When the count is less than a first value, a retard signal is generated. An advance signal is generated when the count is greater than a second predetermined value. These retard and advance signals are accumulated as knock trim signals in RAM storage locations as a function of engine speed and load operating points for each cylinder. During MBT control, MBT trim signals are generated by determining convergence of an average difference in indicated mean effective pressure for each cylinder. These MBT, or minimum spark for best torque, trim signals are stored in another RAM as a function of speed and load operating points. Base ignition timing is then corrected by both the knock trim signal and corresponding MBT trim signal at each speed and load operating point.

U.S. Pat. No. 4,770,144, which issued to Sakakibara et al on Sep. 13, 1988, describes a knock control apparatus and method for internal combustion engines. The apparatus prevents a variation of a control knock sound even if an output of a knock sensor is varied due to the variations in performance among different engines or knock sensors, aging of the engine or knock sensor or the like. A given correction quantity is added to an average value of an output signal of the knock sensor, and the increased by K times by a K-value varying with the operating conditions of the engine, thereby generating a knock discrimination level. In accordance with the presence of knocking determined by comparing the knock discrimination level and an output signal of the knock sensor, a knock control factor, (e.g. ignition timing, supercharge pressure, or the like) of the engine is controlled.

U.S. Pat. No. 4,111,035, which issued West et al on Sep. 5, 1978, describes an engine knock signal generating apparatus with noise channel inhibiting feedback. A vibration sensor is mounted on an internal combustion engine and is characterized by knock-induced vibrations at a characteristic frequency and by other vibrations. The sensor is tuned to resonate at substantially the characteristic frequency. A band pass filter is tuned to the characteristic frequency and is connected to the vibrations sensor output. The output of the filter is provided to one input of a comparator and to average detector circuitry for generating a unidirectional noise reference signal representing noise at the characteristic frequency. The signal is provided to the other input of the comparator. The knock signal, obtained from the output of the comparator and comprising pulses corresponding to knock-induced peaks of amplitude greater than the unidirectional noise reference signal, is fed back through a low-pass filter to the average detector circuitry in sense to oppose increases in the unidirectional noise reference signal during the knock-induced peaks. The connection of the average detector circuitry to the output of the band pass filter provides adaptability for mistuned sensor; the negative feedback to the average detector circuitry reduces the distorting effect, amplified by the band pass filter, of the knock-induced peaks on the unidirectional noise reference signal, which might otherwise distort the out put knock signal.

U.S. Pat. No. 5,263,365, which issued to Muller et al on Nov. 23, 1993, describes a system for detecting misfires in an internal combustion engine. A system for detecting multiple misfires and for allocating misfires to cylinders for detected multiple misfires in multi-cylinder internal combustion engine is so configured that the rough-running values for the individual cylinders are determined. The system then however forms sum terms with these rough-running values and, in turn, forms sums with these sum terms which sums are compared with threshold values. When at least one sum exceeds the corresponding threshold value, then this shows the presence of multiple misfires. As soon as multiple misfires are detected, the rough-running threshold values for allocating misfires to cylinders are reduced. Advantageously, the rough-running values are so modified in advance that their correction terms are influenced as little as possible by misfires. In this way, misfires can also reliably be allocated to individual cylinders when multiple misfires are present.

U.S. Pat. No. 4,903,664, which issued to Shinshi on Feb. 27, 1990, describes a spark ignition timing control system for internal combustion engines with fail safe system for cylinder pressure sensor. A fail safe system for a cylinder pressure sensor is used for a spark ignition timing control system which calculates a physical quantity for combustion energy within the combustion chamber of an engine cylinder of an internal combustion engine and corrects the spark ignition timing on the basis of the physical quantity. The fail safe system sets a running average of a statistical dispersion of the physical quantity to a predetermined greater value when a specific driving condition (i.e. a high engine load and high engine speed condition) is initially determined, and thereafter compares the running average with a predetermined value when the specific driving condition is detected again to detect abnormality of the cylinder pressure sensor.

It is generally known that a sequence of values can be dynamically used to create and maintain a running sum, or total, which can then be used to dynamically calculate a running average. In other words, a running sum or running total is the arithmetic sum of the most recent previous group of values received from a sensor or other source of values. The use of a running sum is well known and the use of a running sum to calculate an average of a preselected number of most recent events is also well known. Using a running sum, or total, to calculate the average of the most recent preselected number of events has certain advantages, such as reducing the amount of scatter or variation in the average because it is averaged over numerous data points. However, the use of a running sum or average has certain inherent disadvantages. As an example, each of the preselected number of data points used in the running sum (e.g. 50, 100, or more) must be stored in computer memory. In addition, when a new value is received from a sensor, that new value must be included with the preselected number of stored values and the oldest one of that preselected number of stored values must be discarded. In some applications, a pointer is used to identify the most recent one of the preselected number of values, and in other cases, a data buffer is shifted upon the receipt of each new value. In addition, the manipulation of the data in the buffer takes time to execute. This time is added to the calculation time to form the average from the running sum and the known number of preselected values used in the calculation.

It would therefore be significantly beneficial if a substitute for the running sum and running average could be dynamically calculated without the need to store a relatively large preselected number of values in computer memory and perform a shifting or indexing operation prior to each execution of the calculations.

The patents described above are hereby expressly incorporated by reference in the description of the present invention.

SUMMARY OF THE INVENTION

A method for determining the operational status of an internal combustion engine, in accordance with a preferred embodiment of the present invention, comprises the steps of providing a sensor which is configured to provide a signal which is representative of a physical event relating to the internal combustion engine. This sensor can be an accelerometer or pressure sensor intended to detect the occurrence of a knock event in a cylinder of an internal combustion engine. The signal provided by the sensor can be a magnitude of vibration or pressure.

The method further comprises the step of receiving a plurality of individual magnitudes of the signal which is associated with a plurality of occurrences of the physical event, such as knock event, relating to the internal combustion engine. In a typical application of the present invention, a series of sequential signals are transmitted from the sensor to a processor, wherein each of the individual magnitudes of the signal represents a particular value or magnitude provided by the sensor.

The present invention further comprises the step of calculating an average magnitude of the plurality of individual magnitudes of the signal according to the equation $$A_N = S_N/N \qquad (1)$$

wherein is the number of individual magnitudes of the signal used in the calculation, $S_N$ is the running sum of the N individual magnitudes of the signal used in the calculation and $A_N$ is the average magnitude of the individual magnitudes of the signal used in the calculation. As an example, if 50 sequential values are used in the calculation and the sum of those 50 values is 4,000, the average value would be 80. In other words, N would be 50, $S_N$ would be 4,000, and $A_N$ would be 80.

It should be clearly understood that the number N can be any convenient magnitude from two to a larger number, depending on the specific goals of the application. Also, although an embodiment of the present invention initializes the running sum $S_N$ and running average $A_N$ prior to performing the repeating steps of the algorithm, it should be clearly understood that both of these values, $S_N$ and $A_N$, can be initially set equal to zero since the normal operation of the subject invention will change their values within a relatively small number of iterations to magnitudes that are generally equivalent to those that such an initialization process would have created.

The method of the present invention, in a preferred embodiment, further comprises the step of amending the running sum upon the receipt of a new one of the plurality of individual magnitudes of the signal according to the equation $$S_N = S_N + M_C - A_P \qquad (2)$$

where $M_C$ is the most recently received magnitude of the signal from the sensor and $A_P$ is the most recently calculated average prior to the receipt of $M_C$. In other words, the running sum $S_N$ is continually updated upon the receipt of a new magnitude $M_C$ from the sensor. The new running sum is calculated as a function of the previously calculated running sum, the most recently received magnitude of the signal $M_C$ and the previously calculated average $A_P$.

The present invention is described herein as comprising the determinations of a sum $S_N$ and a pseudo average $A_N$ according to the equations and procedures shown above. However, it should be understood that the method steps can be reduced to simplified mathematical equivalent steps in certain embodiments to achieve equivalent results. As an example, an initial pseudo average $A_N$ can be set to zero or some other value and then altered, after each receipt of a new value, by simply adding the difference between the previous pseudo average $A_N$ and the newly received value. In this simplified adaptation of the present invention, that difference could advantageously be modified by also multiplying it by a preselected factor which is preferably less than one. As an example of this technique, a previously determined pseudo average $A_N$ of 100 which is followed by a subsequent value of 120 would be modified by adding the difference (i.e. 20) between the previous pseudo average (i.e. 100) and the new value (i.e. 120) multiplied by a preselected decimal value (e.g. 0.03). This would result in a magnitude of 0.6 (i.e. 20 multiplied by 0.03) being added to the value of 100 to result in a new pseudo average $A_N$ of 100.6 which would then be used in subsequent calculations. It should be understood that the procedure described immediately above in this paragraph is equivalent to the procedure described in terms of equations 1 and 2 above and in the description of the preferred embodiment below. It should also be clearly understood that this simplified embodiment of the present invention is intended to be covered by the claims of this patent.

The present invention further comprises the step of determining a threshold value as a function of the most recent value of the average magnitude of the individual magnitudes of the signal, which is referred to as $A_N$. The determining of a threshold value can comprise the step of multiplying the magnitude of $A_N$ by a factor, such as 2.5, or adding an offset value to the most recent value of $A_N$. The threshold value is typically determined in a way which results in a threshold value which is greater in magnitude than the most recent value of $A_N$. It is important to understand that if the most recently received magnitude $M_C$ of the signal exceeds the previously, and most recently, determined threshold value, it is not used in the next calculation of the running sum $S_N$ or the most recent value of $A_N$. Although a fault condition is determined when the most recently received magnitude $M_C$ exceeds the threshold value, the most recently received magnitude $M_C$ is not used to calculate a new average $A_N$ or new threshold value. Only magnitudes of the signal which are acceptable and below the threshold value are used in subsequent calculations of new running sums and new averages $A_N$.

In a particularly preferred embodiment of the present invention, the method further comprises the step of comparing the most recently received magnitude $M_C$ of the signal from the sensor to the threshold value, wherein the step of determining the threshold value comprises the step of adding an offset magnitude of the average magnitude of the preselected number of magnitudes of the signal. By this, it is meant that a threshold value is a value that is greater than the most recent value of $A_N$. This threshold value can be determined by arithmetically adding an offset to the calculated magnitude of $A_N$ or, alternatively, by multiplying the most recently calculated value of $A_N$ by a factor such as 2.5 or 1.5. Whether the threshold value is determined by arithmetically adding a value to $A_N$ or by multiplying the value of $A_N$ by a factor is not limiting to the present invention.

A preferred embodiment of the present invention further comprises the step of determining that a fault event occurred if the most recently received magnitude $M_C$ of the signal from the sensor exceeds the threshold value previously calculated as a function of $A_N$. It also comprises the step of omitting the steps of replacing the sum and replacing the average magnitude if the most recently received magnitude $M_C$ of the signal from the sensor exceeds the threshold value. This omission is intended to prevent successive high values of the most recently received magnitude $M_C$ from improperly and artificially raising both the average $A_N$ and the threshold value. Therefore, the threshold and the average $A_N$ are only calculated and determined as a function of acceptably low values of the most recently received magnitude $M_C$ received from the sensor.

A preferred embodiment of the present invention further comprises the step of taking corrective action when a fault event occurs. The corrective action can be a change in ignition timing or a change in the fueling procedure of the engine. It should be understood that the specific corrective action taken when a fault event is determined is not limiting to the present invention. The sensor can be an accelerometer or a pressure sensor and the physical event, in a typical application of the present invention, is a movement or vibration of the internal combustion engine which relates to the presence or absence of knocking. The preselected number N is typically between the magnitudes 20 and 70, but other numbers can be used in alternative embodiments of the present invention.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
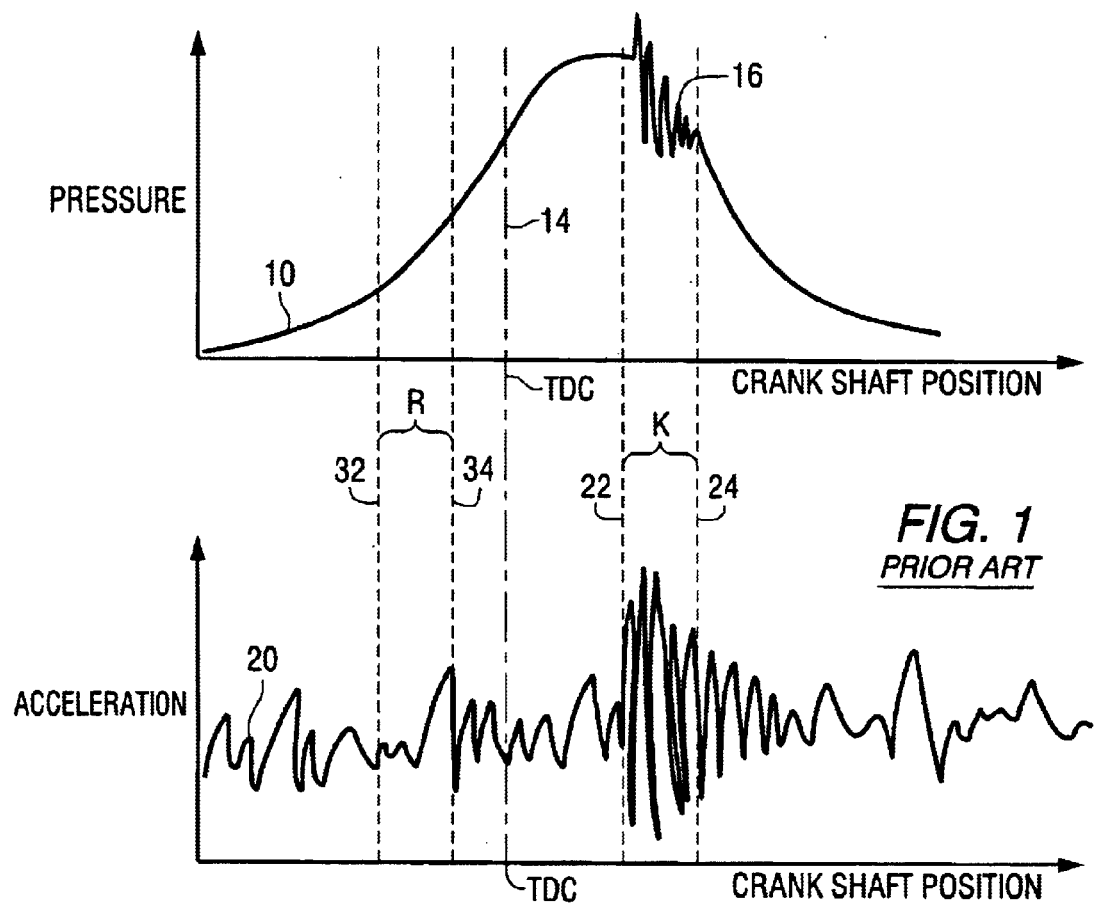
FIG. 1 shows raw data from a pressure sensor and an accelerometer.

Throughout the description of the preferred embodiment of the present invention, like components will be identified by like reference numerals.

As is well known to those skilled in the art, engine knock can be detected either with pressure sensors or accelerometers. FIG. 1 shows two graphical representations of alternate ways of detecting engine knock. In the upper graph, curve 10 shows the pressure magnitudes within a cylinder as a function of crankshaft position. For purposes of reference, dashed line 14 represents the top dead center position of the crankshaft. The perturbations in the pressure curve, identified by reference numeral 16, represent fluctuations in pressure within the combustion chamber that result from the phenomenon known as knock or detonation.

The lower curve 20 in FIG. 1 represents and amplitude measurement provided by an accelerometer attached to an engine. The accelerometer measures the amplitude of vibration of the engine and provides a signal representing that amplitude. In order to determine the knock ratio, the energy within the range between lines 22 and 24 is divided by the energy between lines 32 and 34. Of course, prior to calculating the ratio between the knock window K and the reference window R, the signals are filtered to remove frequencies that are not helpful in determining knock. This is true for both the pressure graph 10 and the accelerometer graph 20.

Figure 2:
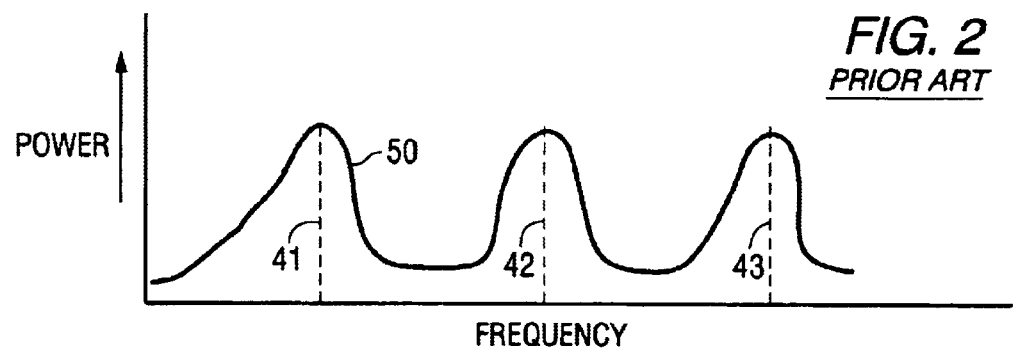
FIG. 2 represents an exemplary output of a triple band pass filter.

In some situations, a band pass filter is used to remove certain frequencies that are irrelevant to the determination of knock. FIG. 2 is a highly simplified representation of the results after the signals shown in FIG. 1 are passed through a triple band pass filter. The three dashed lines, 41–43, represent first, second, and third band pass frequencies that are chosen to be selected by the triple band pass filter. With reference to FIGS. 1 and 2, the signals contained within the knock window K and the reference window R are both filtered by the band pass filter prior to the calculation of a knock ratio by dividing the energy magnitude within knock window K by the energy magnitude within reference window R. The curve 50 in FIG. 2 represents the exemplary energy graphically presented as a function of frequency.

With reference to FIGS. 1 and 2, it should be understood that the angular location of dashed lines 22, 24, 32, and 34 are selected so that the values received after passing the signals through the triple band pass filter, as shown in FIG. 2, are representative of a region K that is likely to indicate knock if it exists and a reference window R which is likely to be free of knock perturbations so that it can be used as a reference to be divided into the energy magnitude within the knock window K. The precise angular positions of the knock window and reference window, K and R respectively, are not limiting to the present invention and can vary as a function of the particular application of the knock sensors, whether they are pressure sensor or accelerometers.

With continued reference to FIGS. 1 and 2, after the pressure or accelerometer data is received, the knock and reference windows are used to isolate the signals for each cylinder of an internal combustion engine. These values are then passed through the triple band pass filter to remove unwanted frequencies that are not helpful in the determination of a knock event. Then the signals from the knock window and reference window are used to calculate the knock ratio by dividing the energy within the reference window into the energy within the knock window. As is generally known to those skilled in the art, it is then possible to calculate a running average of all non-knocking magnitudes of ratio from a series of magnitudes received from the sensors and filters. These magnitudes, which are actually knock ratios, are then sequentially examined to determine if a knock event is represented by any one of those sequential magnitudes. In order to determine the occurrence of a knock event, a threshold value is calculated as a function of the average of a series of magnitudes of ratio. Each subsequent magnitude of knock ratio is then compared to the current magnitude of the threshold value to determine whether the most recent knock ratio exceeds that threshold or not. If it exceeds the threshold, a fault condition is determined and corrective action is prescribed. The corrective action can be a change in the ignition timing, a change in the fuel injection timing, or another corrective step. This basic procedure is generally known to those skilled in the art.

Figure 3:
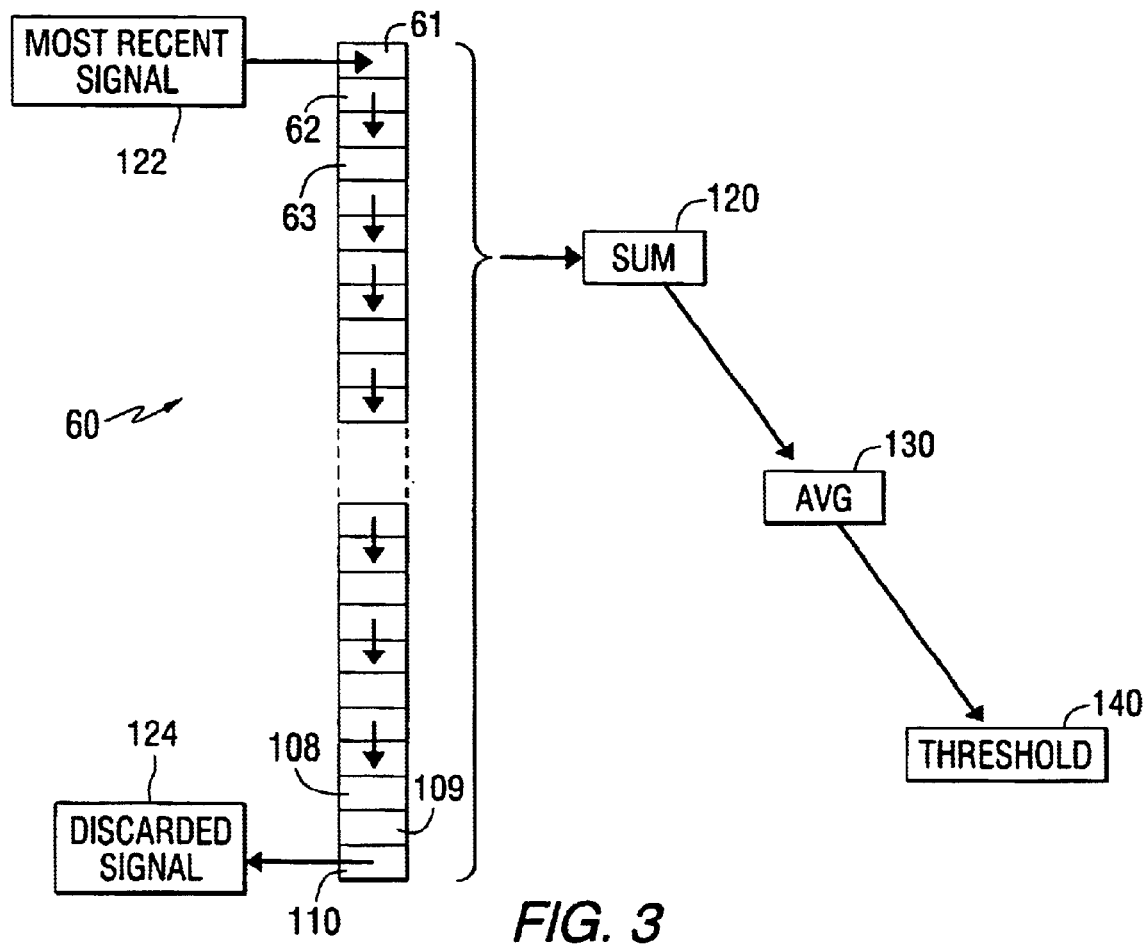
FIG. 3 is a schematic representation of the process known to those skilled in the art for manipulating knock-related data.

FIG. 3 illustrates a method that is generally known to those skilled in the art for determining the threshold value to which each subsequent knock ratio magnitude will be compared. A one dimensional array 60 of data is provided within a microprocessor or similar device. For purposes of this example, it will be assumed that 50 individual storage locations, schematically represented by reference numeral 61, 62, 63 and 108, 109, 110. When the array 60 is filled with sequential occurrences of received knock ratios, a running sum 120 is determined. The running sum 120 is simply the arithmetic sum of all of the values stored in the individual storage locations of the data array 60.

When a new magnitude 122 of knock ratio is received, it is stored in location 61 after the other locations are shifted as represented by the arrows in FIG. 3. When this occurs, the magnitude stored in location 110 is discarded, as represented by reference numeral 124. It should be understood that, in actual practice, the individual magnitudes are not typically each shifted from location to location as represented in FIG. 3. Instead, most applications of this technique would move an index pointer which indicates the location where the next magnitude received from the sensor will be stored. Then, the index pointer is moved in anticipation of the next magnitude to be received.

With continued reference to FIG. 3, the running sum 120 is divided by the number of data entries in the data array 60 to calculate the average 130. The average 130 is then multiplied by a preselected factor, such as 2.5, to determine a threshold 140 that will be used when the next signal 122 is received. It is important to note that if the next signal received is not less than the threshold 140, it will not be used in the subsequent calculation of the running sum 120. Instead, a fault condition will be determined and the most recently received magnitude will be discarded. As a result, the sum 120, the average 130, and the threshold 140 will not be changed upon the receipt of a most recent signal 122 that is not less than the threshold 140.

With continued reference to FIG. 3, it can be seen that a relatively large number of data locations must be devoted to the data array 60. In addition, the process of either shifting the data within the data array 60 or moving the index pointer from position to position requires a finite period of time to accomplish. As an engine operates, each rotation of the crankshaft requires that this process be performed for each cylinder. This requires significant computational time, particularly if the data manipulation associated with the data array 60 is necessary on each rotation of the crankshaft. It should be understood that the crankshaft rotates at significantly high speeds when the engine is operating in its range which is most likely to experience knock. This range can be approximately 6,000 RPM. As a result, the data manipulation described above in conjunction with FIG. 3 must be completed within a window of time that cannot exceed 0.01 seconds. Therefore, it would be significantly beneficial if the process could be simplified and the required data storage locations could be reduced.

Figure 4:
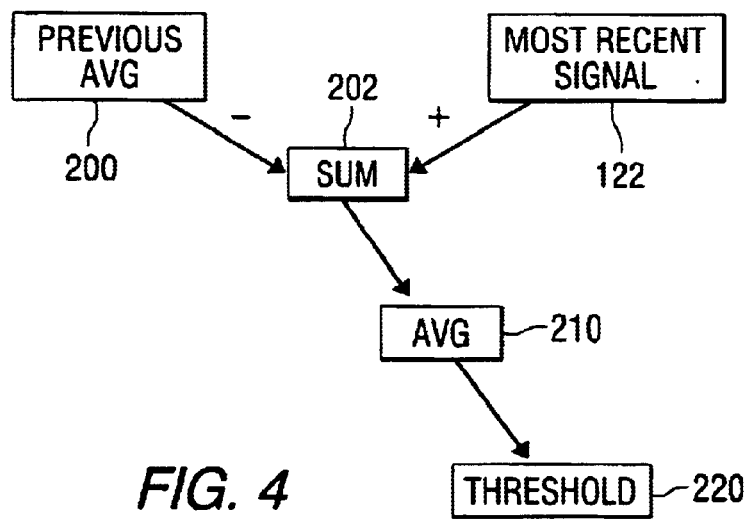
FIG. 4 is a schematic representation of the process incorporated by the present invention.

FIG. 4 is a simplified schematic representation of the method of the present invention. Initially, a previous average 200 is determined. This can be determined in several ways. The most common way of determining the initial average, upon start-up, is by sequentially receiving a preselected number of magnitudes from the sensing system, which can comprise a pressure sensor, an accelerometer, or other component, and summing the magnitudes as they are received. That sum is then divided by the number of magnitudes received to calculate the initial average 200. This can be done without the requirement of a multiple location data array 60 that requires multiple memory locations. The data can be summed as it is received in a single location in memory and then later divided by the number of magnitudes that were added to each other. Although the initialization process described above can be useful, in which the algorithm begins by determining a running sum $S_N$ and running average $A_N$ prior to performing the repeating steps of the algorithm, it should be clearly understood that both of these values, $S_N$ and $A_N$, can be initially set equal to zero since the normal operation of the subject invention will naturally and automatically change their values within a relatively small number of iterations to magnitudes that are generally equivalent to those that such an initialization process would have created. It should be clearly understood that the number N can be any convenient magnitude from two to a larger number, depending on the specific goals of the application. Larger values of N can result in a smoothing of the values of the pseudo-average $A_N$, with less variability between sequential samples.

Once the previous average value 200 is determined, it is then subtracted from the previously determined sum 202. The most recently received magnitude 122 is then added to the previously determined sum 202. In other words, upon the receipt of each new signal 122, the sum 202 is modified in two ways. First, the magnitude of the most recent signal 122 is added to the sum 202 and, second, the previous average 200 is subtracted from it. The newly determined sum 202 is then divided by the same number that was used in the initial determination of the previous average 200. The resulting average 210 is then used to determine the threshold 220 by multiplying the average 210 by a factor, such as 2.5, or adding an offset magnitude to the average 210 to calculate the new threshold 220.

It should be clearly understood that when the system is initially activated, it calculates the previous average 200 by adding a preselected number (e.g. 50) of sequential magnitudes received from the knock sensor and then divides the sum by the preselected number. That initializes the system by determining the initial value of the previous average 200. This process need not be repeated after the initialization. Upon the receipt of each new magnitude 122, the previously determined sum 202 is modified by two mathematical operations, adding the most recent signal 122 to the sum 202 and subtracting the previous average 200 from the sum 202. This newly determined sum 202 is then divided by the preselected number of magnitudes used in the initialization process. From the average 210, the threshold 220 is determined by either multiplying the average 210 by a factor or by adding an offset factor to the average 210. The number of required memory locations is significantly reduced, as can be seen by comparing FIG. 4 to FIG. 3. In addition, the required calculations performed upon each receipt of a new signal 122 is significantly reduced since the data buffer 60 in FIG. 3 need not be managed and manipulated.

Figure 5:
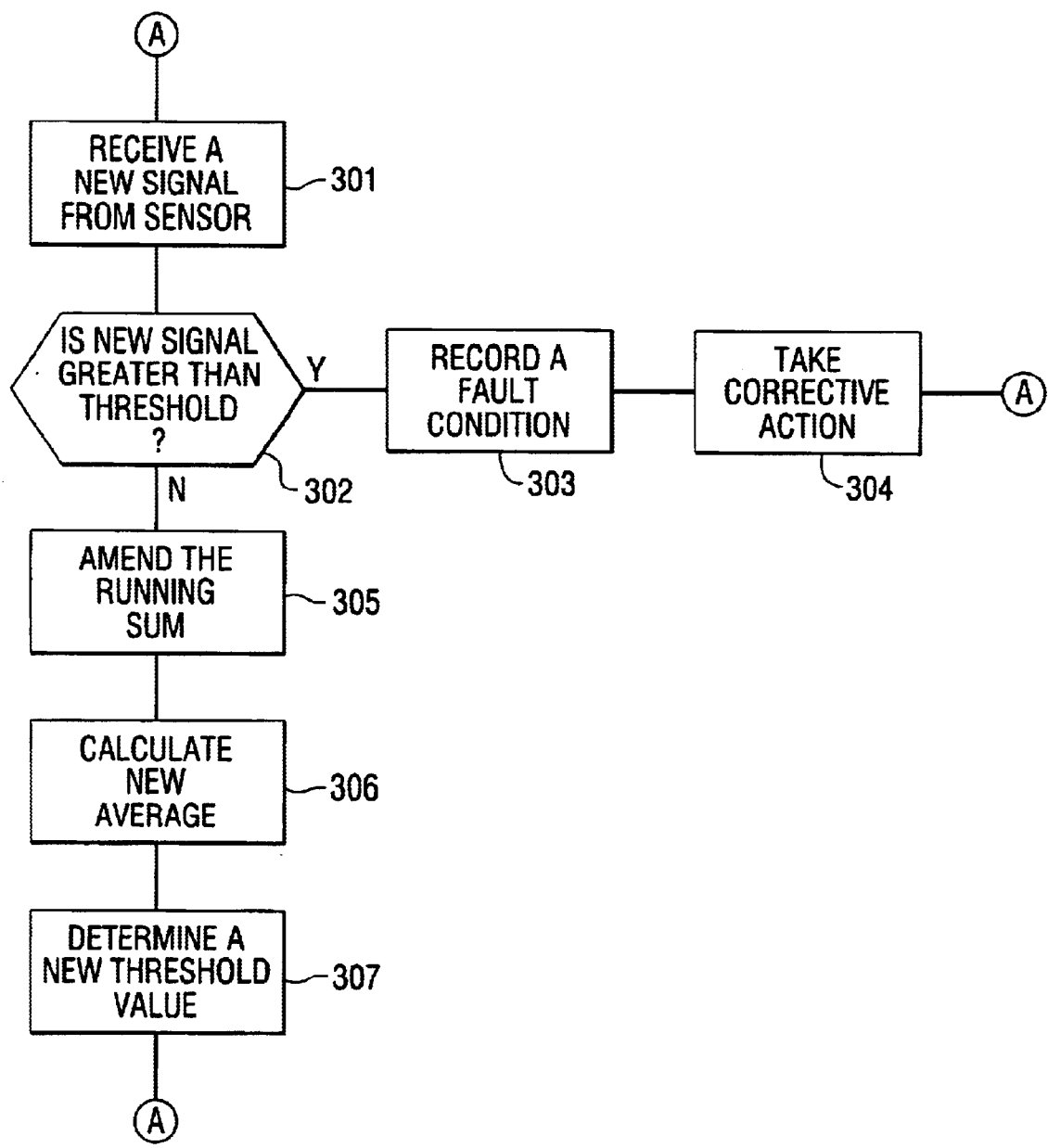
FIG. 5 is a simplified flowchart showing the basic steps of the present invention.

The procedure of the present invention is typically performed by a microprocessor that performs the steps shown in FIG. 5. It should be understood that the flowchart illustrated in FIG. 5 is exemplary and highly simplified to show only the major steps of the present invention. With reference to FIGS. 4 and 5, the first step of the program is to receive a new signal 122 from the sensor. This is identified at functional block 301 in FIG. 5. Next, the new signal 122 is compared to the previously determined threshold 220. This is shown in functional block 302. If the new signal is greater than the threshold 220, this indicates that a knock occurrence has been detected. This is determined to be a fault condition which is recorded at functional block 303. In conjunction with functional block 303, it would be typical for the microprocessor to take corrective action in response to the sensing of a knock condition relating to the engine. This corrective action is represented at functional block 304 and would typically comprise a change in the ignition timing of the engine, at least momentarily, and possibly a change in the fuel injection timing if the knock condition is determined to be severe. After the corrective action at 304, the program returns to point A to receive a new signal at functional block 301.

With continued reference to FIGS. 4 and 5, the running sum 202 is amended at functional block 305 if it has been determined that the new signal 122 is not greater than the threshold 220. This amending of the running sum at functional block 305 is performed by adding the most recent signal 122 to the sum 202 and subtracting the previous average 200 from it. After the sum 202 has been amended at functional block 305, a new average 210 is calculated at functional block 306 and a new threshold 220 is determined at functional block 307. The program then returns to point A to receive a new signal at functional block 301.

As described above in conjunction with FIGS. 1 and 2, it should be understood that prior to receipt of a new signal 122, the pressure sensor or accelerometer data is received, the knock window K and the reference window R are both passed through a triple band past filter, rectified and integrated to determine the energy level of the signals within both the knock and reference windows, K and R, respectively. These two values are then used to determine the knock ratio by dividing the energy in the reference window R into the energy in the knock window K. This knock ratio is a magnitude received by the microprocessor that performs the functions described above in conjunction with FIG. 5. If the most recently received magnitude 122 is less than the threshold 220, the newly received magnitude is used to amend the current value of the sum 202, calculate a new average 210, and determine a new threshold 220.

With reference to FIGS. 1–5, the method of the present invention, in a preferred embodiment, comprises the steps of providing a sensor which is configured to provide a signal, 10 or 20, which is representative of a physical event (e.g. a knock event) relating to the internal combustion engine. It further comprises the step of receiving a plurality of individual magnitudes of the signal which is associated with a plurality of occurrences of the physical event relating to the internal combustion engine. It should be understood that the plurality of individual magnitudes is actually a plurality of magnitudes of knock ratio calculated after filtering the sensor outputs illustrated in FIG. 1 as graphs 10 or 20. After the filtering of the knock window K and the reference window R, the filtered results are used to divide the knock energy K by the reference energy R to calculate a knock ratio which is then used by the present invention.

With continued reference to FIGS. 1–5, the present invention further comprises the step of calculating an average magnitude 210 of the plurality of individual magnitudes of the signal according to equation 1 illustrated above. In other words, the average 210 in FIG. 4 is determined by dividing the sum 220 by the preselected number of individual magnitudes used in the original calculation of the previous average 200. When the first value of the previous average 210 was determined, during the initialization of the system, the number of individual magnitudes used in this calculation was N, as used in equation 1. The value of N can be any appropriate number.

Figure 6:
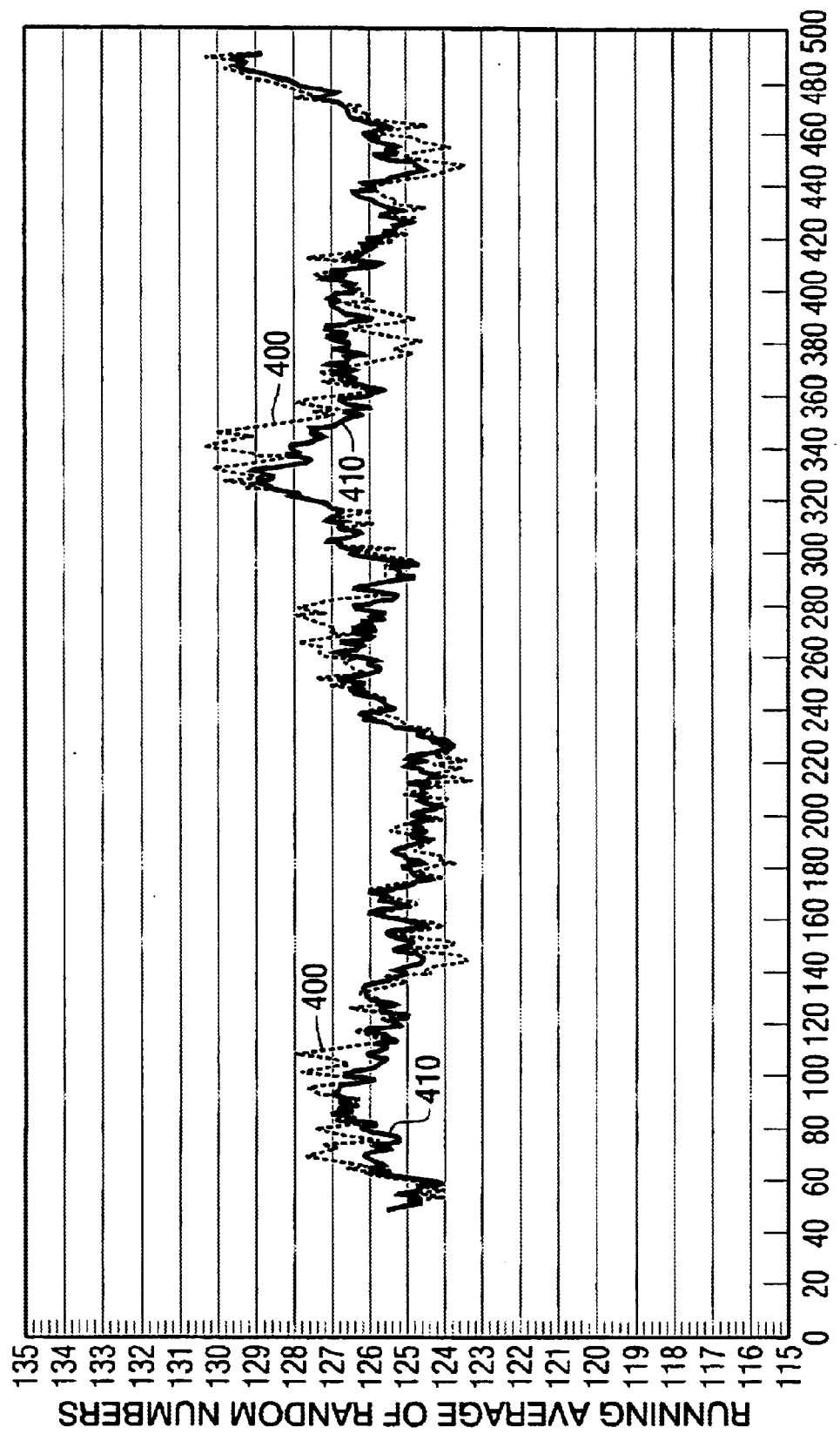
FIG. 6 is a graphical representation comparing a pseudo-average of the present invention to an actual running average calculated according to methods known in the prior art.

With references to FIGS. 3 and 4, it should be understood that the resulting sum determined by the present invention is not mathematically equal to the resulting sum 120 achieved according to the prior art method of determining a running sum by using a plurality of shifting data points in a data array 60 even if the most recent N magnitudes in both cases are identical. The mathematical processes of the present invention are highly simplified in order to reduce the number of memory locations needed and to minimize the execution time required to perform the calculations. As a result, the sum 202 achieved by the present invention is not a true running sum like that identified by reference numeral 120 in FIG. 3. Instead, it is a pseudo-sum that differs slightly from an actual running sum calculated according to the prior art method illustrated in FIG. 3. Similarly, the average 210 resulting from the method of the present invention is a pseudo-average which is mathematically different than the average 130 resulting from the prior art calculation. Finally, the threshold 220 resulting from the method of the present invention is a pseudo-threshold that differs slightly from the threshold 140 calculated by the known method illustrated in FIG. 3. Although the pseudo-sum, pseudo-average, and pseudo-threshold resulting from the present invention differ slightly from those calculated and determined according to known methods, the differences are not significant. As an example, FIG. 6 is a graphical representation, taken over slightly less than 500 sequential samples of magnitudes. The dashed line 400 represents a running average 130 that was calculated according to the known techniques described above in conjunction with FIG. 3. In other words, the running average 130 represented by dashed line 400 was calculated by first determining a true running sum 120 by adding the magnitudes of the previous 50 received magnitudes together. Upon the receipt of each new magnitude 122, the oldest magnitude 110 was discarded and a new total was calculated. The running average 130, represented by dashed line 400, was then determined by dividing the running sum 120 by 50 because 50 samples were used in the data array 60. Compared to dashed line 400, solid line 410 represents the pseudo-average 210 calculated according to the steps of the present invention. As can be seen in FIG. 6, the pseudo-average 410 differs slightly from the running average 400, but the differences are not significant for these purposes. Since the average, whether it is the running average 400 or the pseudo-average 410, is used calculate a threshold 220, this intended function is not seriously affected by the use of a pseudo-average 210 as opposed to an actual running average 130 as known in the prior art. The differences between lines 400 and 410 in FIG. 6 are slight in comparison to the overall magnitudes of the values and can be used successfully to determine a threshold magnitude for purposes of comparison with subsequently received knock ratio magnitudes. The memory locations saved and the reduced processing time represent advantages that far outweigh the slight differences in mathematical value between corresponding positions of the pseudo-average 410 and the running average 400 shown in FIG. 6.

Although the present invention has been described in particular detail and illustrated to show a preferred embodiment, it should be understood that alternative embodiments are also within its scope.

I claim:

1. A method for determining the operational status of an internal combustion engine, comprising the steps of:
   providing a sensor which is configured to provide a signal which is representative of a physical event relating to said internal combustion engine;
   receiving a plurality of individual magnitudes of said signal which is associated with a plurality of occurrences of said physical event relating to said internal combustion engine;
   calculating an average magnitude of said plurality of individual magnitudes of said signal according to the equation $A_N=S_N/N$, where N is the number of individual magnitudes of said signal used in the calculation, $S_N$ is the running sum of the N individual magnitudes of said signal used in the calculation, and $A_N$ is the average magnitude of the individual magnitudes of said signal used in the calculation;
   amending the running sum upon the receipt of a new one of said plurality of individual magnitudes of said signal according to the equation $S_N=S_N+M_C-A_P$, where $M_C$ is the most recently received magnitude of said signal from said sensor and $A_P$ is the most recently calculated average prior to the receipt of $M_C$; and
   determining a threshold value as a function of the most recent value of $A_N$.

2. The method of claim 1, further comprising:
   comparing said most recently received magnitude of said signal to said threshold value, wherein said step of determining said threshold value comprises the step of adding an offset magnitude to said average magnitude of said preselected number of said magnitudes of said signal.

3. The method of claim 2, further comprising:
   determining that a fault event occurred if said most recently received magnitude of said signal exceeds said threshold value.

4. The method of claim 3, further comprising:
   taking corrective action when said fault event occurs.

5. The method of claim 4, wherein:
   said corrective action is a change in ignition timing.

6. The method of claim 2, further comprising:
   omitting said steps of replacing said sum and replacing said average magnitude if said most recently received magnitude of said signal exceeds said threshold value.

7. The method of claim 1, wherein:
   said sensor is an accelerometer.

8. The method of claim 1, wherein:
   said physical event is a movement of said internal combustion engine which relates to the presence or absence of knocking.

9. The method of claim 1, wherein:
   said preselected number is between two and fifty.

10. The method of claim 1, wherein:
    said physical event is a knock event in a cylinder of said internal combustion engine.

11. A method for determining the operational status of an internal combustion engine, comprising the steps of:
    providing a sensor which is configured to provide a signal which is representative of a physical event relating to said internal combustion engine;
    receiving a plurality of individual magnitudes of said signal which is associated with a plurality of occurrences of said physical event relating to said internal combustion engine;
    calculating an average magnitude of said plurality of individual magnitudes of said signal according to the equation $A_N=S_N/N$, where N is the number of individual magnitudes of said signal used in the calculation, $S_N$ is the running sum of the N individual magnitudes of said signal used in the calculation, and $A_N$ is the average magnitude of the individual magnitudes of said signal used in the calculation;
    amending the running sum upon the receipt of a new one of said plurality of individual magnitudes of said signal according to the equation $S_N=S_N+M_C-A_P$, where $M_C$ is the magnitude of the most recent receipt of said signal from said sensor and $A_P$ is the most recent average calculated prior to the receipt of $M_C$; and
    determining a threshold value as a function of the most recent value of $A_N$.

12. The method of claim 11, further comprising:
    comparing said magnitude of the most recent receipt of said signal to said threshold value; and
    determining that a fault condition has occurred if said threshold value is greater than said magnitude of the most recent receipt of said signal.

13. The method of claim 12, further comprising:
    omitting said amending step when said fault condition has been determined.

14. The method of claim 12, further comprising:
    taking corrective action when said fault condition has been determined.

15. The method of claim 14, wherein:
    said corrective action comprises changing the ignition timing of said engine.

16. The method of claim 14, wherein:
    said corrective action comprises changing the fuel injection timing of said engine.

17. A method for determining the operational status of an internal combustion engine, comprising the steps of:
    providing a sensor which is configured to provide a signal which is representative of a physical event relating to said internal combustion engine;
    receiving a plurality of individual magnitudes of said signal which is associated with a plurality of occurrences of said physical event relating to said internal combustion engine;
    calculating an average magnitude plurality of individual magnitudes of said signal according to the equation $A_N=S_N/N$, where N is the number of individual magnitudes of said signal used in the calculation, $S_N$ is the running sum of the N individual magnitudes of said signal used in the calculation, and $A_N$ is the average magnitude of the individual magnitudes of said signal used in the calculation;
    determining a threshold value as a function of the most recent value of $A_N$;

receiving a most recent receipt of said signal from said sensor comparing a magnitude of a most recent receipt of said signal to said threshold value;

determining that a fault condition has occurred if said threshold value is greater than said magnitude of the most recent receipt of said signal; and amending the running sum upon the receipt of said most recent receipt of said signal, if said threshold value is not greater than said magnitude of the most recent receipt of said signal, according to the equation $S_N = S_N + M_C A_P$, where $M_C$ is said magnitude of said most recent receipt of said signal and $A_P$ is the most recent average calculated prior to the receipt of $M_C$.

18. The method of claim 17, further comprising:

taking corrective action when said fault condition has been determined.

19. The method of claim 18, wherein:

said corrective action comprises changing the ignition timing of said engine.

20. The method of claim 19, wherein:

said corrective action comprises changing the fuel injection timing of said engine.

* * * * *